UNITED STATES PATENT OFFICE.

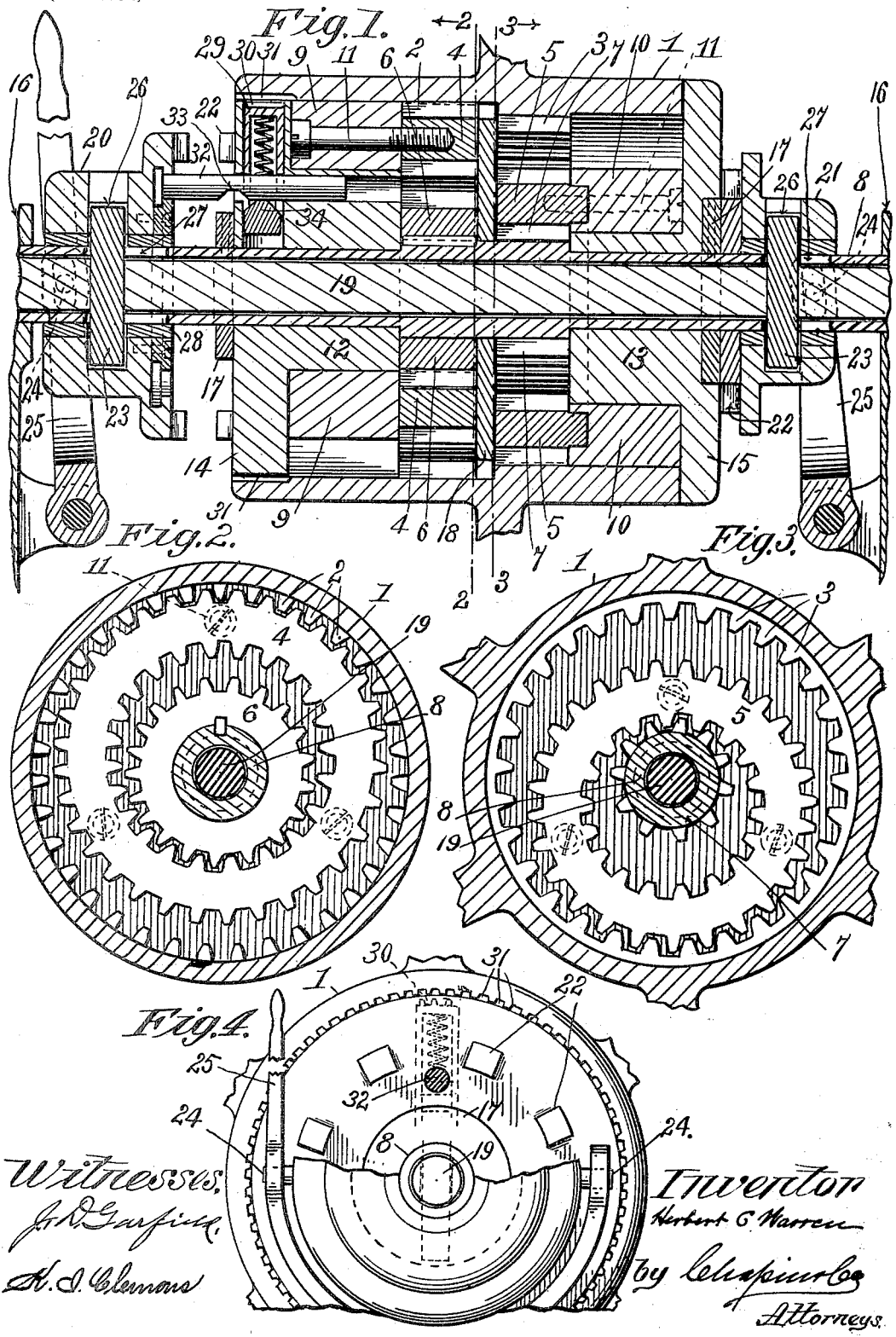

HERBERT C. WARREN, OF HARTFORD, CONNECTICUT, ASSIGNOR OF ONE-HALF TO AMOS WHITNEY, OF SAME PLACE.

VARIABLE-SPEED MECHANISM.

SPECIFICATION forming part of Letters Patent No. 668,135, dated February 12, 1901.

Application filed June 5, 1900. Serial No. 19,138. (No model.)

*To all whom it may concern:*

Be it known that I, HERBERT C. WARREN, a citizen of the United States of America, residing at Hartford, in the county of Hartford and State of Connecticut, have invented new and useful Improvements in Variable-Speed Mechanism, of which the following is a specification.

This invention relates to variable-speed mechanisms, and has for its object the construction of a device of this character which shall be capable of two variations from the normal speed of the driving-shaft and which shall be compact, strong, and easily operated.

The invention consists in certain novel constructions and arrangements of parts whereby the above-mentioned changes in speed may be effected, all as fully described in the following specification and pointed out in the claims.

In the drawings forming part of this specification, Figure 1 is a longitudinal section of the mechanism embodying this invention. Fig. 2 is a cross-section on line 2 2, Fig. 1, looking to the left. Fig. 3 is a cross-section on line 3 3 looking to the right; and Fig. 4 is a left-hand end view thereof, partly broken away and with the standard in which the driving-shaft runs removed.

Referring to the drawings, 1 represents a driven member—as the hub of a pulley, sprocket-wheel, or gear, &c.—within which are the two internal racks 2 and 3. Two eccentrically-supported gears 4 and 5, having both external and internal teeth, intermesh externally with said racks, as shown in Figs. 2 and 3, and internally these gears intermesh with the pinions 6 and 7, one of which, 6, is keyed to the driving-shaft 8, the other being integral with said shaft, though not necessarily. The intermediate eccentric gears 4 and 5 mesh into their respective racks at opposite points and are supported in their eccentric positions by being secured to the hubs 9 and 10 by screws 11, which hubs may rotate on the eccentric bearings 12 and 13, which are secured to or form part of the two heads 14 and 15, which close each end of the said hub or driven member 1. These heads are fitted concentrically on the driving-shaft 8 and are adapted to rotate thereon. This shaft is supported for rotation in suitable bearings 16, a part of one at each end of the mechanism being shown in Fig. 1. Suitable means, as the collars 17, secured to the shaft, are provided for keeping the various members of the mechanisms in their proper relative positions on the shaft, and preferably an annular plate 18 is placed on the shaft 8, between the contiguous sides of the eccentric gears 4 and 5. Now if one of the two heads 14 13 be locked to the member 1 and the shaft 8 be rotated the member 1 will be driven at the same speed as the shaft—that is, as though it were integral therewith—for it will be locked to the shaft through the engagement of the pinions 6 and 7 with the eccentric gears 4 and 5, which mesh therewith, as well as with the said driven member. If, however, one of the heads 14 or 15 be held stationary on the shaft and the other be left free to rotate, then the member 1 will be driven by one or the other of the said intermediate eccentric gears and its pinion, and as these pinions and gears are of different diameters the resultant speed of the member 1 will be determined by the relative proportion of its diameter to the diameter of the driving eccentric gear. Means are provided for holding one or the other of said heads 14 15 stationary, whereby the devices connected with the said head will transmit movements to the driven member 1 at a rate of speed different from that of the driving member—the shaft 8—as follows: The shaft 8 is made hollow, and a rod 19, which has reciprocatory endwise movement, is located therein. Two clutches 20 and 21 are mounted on the shaft 8, a short distance from the heads 14 15. These clutches engage bosses 22 on the said heads when the former are moved up against said heads. The clutches are pinned to the rod 19 by pins 23; but the clutch itself does not rotate, being held against rotation by pins 24 in the ends of forked arms 25, pivotally connected to the bearings to swing axially of the shaft, and whereby by means of a handle attached to one of the arms 25 one of said clutches may be moved into clutch engagement with one of said heads and the other moved out of engagement with the other head. When one of the clutches is moved up against one of the heads 14 15 and becomes interlocked therewith, then the pinion on the shaft 8 will cause the intermediate gear to rotate on the eccentrically-located hub of the head, and thus drive the member 1. Meanwhile the other head will be free on the driving-shaft.

The pins 23 are permitted to rotate with the driving-shaft and rod within an annular cavity 26 in the clutch. Where said pins pass through the shaft 8 the latter is slotted, as at 27, to permit the pins 23 to travel with the rod and carry the clutches when the rod is moved endwise, as above described.

To facilitate the construction of the clutch, it is bored out larger than the shaft, and the annular groove or cavity 26, within which the ends of the pins 23 are to rotate, is then turned in the clutch and a bushing 28 then fitted into the hole through the clutch, which bushing, being pinned to the shaft, rotates within the clutch. The distance between the clutches is such that they may be so placed relative to the heads that both of the latter will be free to rotate. If now one of the heads, as 14, be locked to the driven member 1 and the clutches are free from both the heads, then the speed of rotation of the driven member will obviously be the same as that of the driving-shaft. If the clutch 20 be thrown into engagement with the head 14, the speed of the driven member will be governed by the relative diameters of the pinion 6 and the internal rack, which it drives through the medium of the intermediate gear 4; or, if the clutch 21 be thrown into engagement with the head 15, then the speed of the member 1 will be governed by the diameter of the pinion 7. Means are provided, however, for the locking of the head 14 to the member 1 independently of the interlocking of either clutch 20 or 21 with their respective heads. By this means with both heads 14 and 15 free on the shaft 8 the member 1 must rotate with the latter.

The locking means operating between the head 14 and the member 1 consists of a spring-bolt 29, so located in the head 14 as to have a radial movement against the inner surface of the member 1, within which the head 14 lies. Said bolt is provided on its outer end with teeth 30, adapted to engage teeth 31, cut in the inner surface of the end of the member 1, which incloses said head. Said locking-bolt is operated by another bolt 32, passing through a hole in the locking-bolt and having a notch 33 therein with tapered sides, adapted to receive the similarly-tapered cam projection 34 at the base of the bolt 29. Said operating-bolt 32 has a flat flanged head, which engages with a T-groove in the end of the clutch 20, as shown in Fig. 1, to the end that said bolt may move freely with the rotating head 14 and yet be operable endwise by the sliding movement of the non-rotating clutch on the shaft 8. When the clutch 20 is moved toward the head 14, the clutch 21 will become disengaged from the head 15 an instant prior to the interlocking of the bolt 29 with the teeth 30, and this interlocking movement may take place without the clutch 20 becoming engaged with the head 14. Thus the latter and the member 1 may, when the parts are in this position, be rotated as one piece, and as the gears 4 and 5 cannot rotate on their eccentric hubs 12 and 13 as long as the heads are free to rotate on the shaft said gears remain stationary and act merely as means of connection between the pinions 6 and 7 and said member 1, which, as stated, must then rotate as one piece with said shaft 8. Further movement of the clutch 20 toward the head 14 will effect the depression of the spring-bolt 29 by the action of the tapered side of the notch 33 acting on the tapered side of the cam projection 34. The movement of the clutch 20 in a reverse direction will reverse the above-described movements.

Having thus described my invention, what I claim, and desire to secure by Letters Patent of the United States, is—

1. A variable-speed mechanism comprising a driven member, a rotatable driving member concentric therewith, two internal annular racks of different diameters on said driven member, two pinions on said driving member, two internally and externally toothed gears, each in mesh with one of said pinions and one of said racks, eccentric supports for each of said gears loose on the driving member, and means for holding either one of said supports temporarily stationary while the driving member is rotating, whereby said driven member may be rotated at speeds different from that of the driving member, substantially as described.

2. A variable-speed mechanism comprising a driven member, a rotatable driving member concentric therewith, two internal annular racks of different diameters on said driven member, two pinions on said driving member, two internally and externally toothed gears, each in mesh with one of said pinions and one of said racks, eccentric supports for each of said gears loose on the driving member, and means for temporarily locking one of said supports to said driven member, substantially as described.

3. A variable-speed mechanism comprising a driven member, a rotatable driving member concentric therewith, two internal annular racks of different diameters on said driven member, two pinions on said driving member, two internally and externally toothed gears, each in mesh with one of said pinions and one of said racks, eccentric supports for each of said gears loose on the driving member, a non-rotatable clutch member in proximity to each of said supports, and means for moving one of said clutch members into engagement with one of said supports and simultaneously disengaging the other clutch member from the other support, whereby either one of said supports may be held temporarily stationary while the driving member is rotating, substantially as described.

4. A variable-speed mechanism comprising a driven member, a rotatable driving member concentric therewith, two internal annular racks of different diameters on said driven member, two pinions on said driving member, two internally and externally toothed gears, each in mesh with one of said pinions and one of said racks, eccentric supports for each of said gears loose on the driving member, a non-rotatable clutch member in proximity to each of said supports, and means for moving one of said clutch members into engagement with one of said supports consisting of a rod having an endwise movement in said driving member, and a pin traversing said rod and passing through slots in said driving member into an annular cavity in each of said clutch members, whereby the movement of one of said clutch members toward one of said supports will move the other clutch member away from the other of said supports, substantially as described.

5. A variable-speed mechanism comprising a driven member, a rotatable driving member concentric therewith, two internal annular racks of different diameters on said driven member, two pinions on said driving member, two internally and externally toothed gears, each in mesh with one of said pinions and one of said racks, eccentric supports for each of said gears loose on the driving member, means for holding one or the other of said supports temporarily stationary, during the rotation of the driving member, consisting of non-rotatable clutch members slidable on the driving member; means for locking one of said supports to the driven member during the disengagement of the clutch members with said supports, consisting of a bolt in one of said supports adapted to engage said driven member, and means between said bolt and one of said clutch members and operated by the movements of the latter, whereby said bolt is actuated, substantially as described.

HERBERT C. WARREN.

Witnesses:
WILLIAM M. STORRS,
J. H. PINNEY.